(12) United States Patent
Mian et al.

(10) Patent No.: US 9,121,747 B2
(45) Date of Patent: Sep. 1, 2015

(54) OBJECT EVALUATION ACCOUNTING FOR MOTION-RELATED DYNAMIC FORCES

(71) Applicant: International Electronic Machines Corporation, Troy, NY (US)

(72) Inventors: Zahid F. Mian, Loudonville, NY (US); Ronald W. Gamache, East Greenbush, NY (US); Carl W. Liebfried, Rensselaer, NY (US)

(73) Assignee: International Electronic Machines Corp., Troy, NY (US)

( * ) Notice: Subject to any disclaimer, the term of this patent is extended or adjusted under 35 U.S.C. 154(b) by 294 days.

(21) Appl. No.: 13/622,111

(22) Filed: Sep. 18, 2012

(65) Prior Publication Data
US 2014/0190753 A1 Jul. 10, 2014

Related U.S. Application Data

(60) Provisional application No. 61/573,178, filed on Sep. 19, 2011.

(51) Int. Cl.
*G01G 19/02* (2006.01)
*G01G 19/03* (2006.01)
*G01G 19/04* (2006.01)
*G01G 23/00* (2006.01)

(52) U.S. Cl.
CPC ............ *G01G 19/035* (2013.01); *G01G 19/047* (2013.01); *G01G 23/002* (2013.01)

(58) Field of Classification Search
CPC ... G01G 19/035; G01G 19/045; G01G 19/03; G01G 19/047; G01G 19/04; G01G 19/07; G01G 23/002

USPC ........... 73/862.041–862.046; 177/132–135, 1
See application file for complete search history.

(56) References Cited

U.S. PATENT DOCUMENTS

| | | | | |
|---|---|---|---|---|
| 2,590,946 A * | 4/1952 | Darling | .................... | 340/870.05 |
| 2,815,480 A * | 12/1957 | Ruge | .............................. | 323/367 |
| 2,868,535 A * | 1/1959 | Ruge | .............................. | 177/161 |
| 3,593,263 A * | 7/1971 | Olsen | ............................ | 340/935 |
| 3,679,011 A * | 7/1972 | Hawver | ........................ | 177/134 |

(Continued)

FOREIGN PATENT DOCUMENTS

| | | |
|---|---|---|
| DE | 10236268 A1 | 2/2004 |
| EP | 0423440 | 4/1991 |

(Continued)

OTHER PUBLICATIONS

Kool, Australian Patent Examination Report No. 1 for Application No. 2012312501, Jun. 27, 2014, 3 pages.

(Continued)

*Primary Examiner* — Randy W Gibson
(74) *Attorney, Agent, or Firm* — LaBatt, LLC

(57) ABSTRACT

A solution for evaluating an object, which accounts for various motion-related dynamic forces is provided. In an embodiment, the object is a vehicle and the evaluation includes determining a set of static weights corresponding to the vehicle as it moves through a sensing element. The sensing element can include a load plate with vertical force sensing devices and horizontal force sensing devices located below the load plate. Analysis of measurement data acquired by the force sensing devices can enable calculation of the set of static weights corresponding to the vehicle.

20 Claims, 9 Drawing Sheets

(56) References Cited

U.S. PATENT DOCUMENTS

| | | | |
|---|---|---|---|
| 3,734,216 A * | 5/1973 | Nordstrom et al. | 177/136 |
| 3,747,715 A * | 7/1973 | Nordstrom et al. | 177/134 |
| 3,835,945 A * | 9/1974 | Yamanaka et al. | 177/134 |
| 3,871,491 A | 3/1975 | Yamanaka et al. | |
| 3,949,822 A * | 4/1976 | English et al. | 177/126 |
| 3,999,621 A | 12/1976 | Wagner | |
| 4,158,396 A * | 6/1979 | Suzuki et al. | 177/210 R |
| 4,261,428 A | 4/1981 | Bradley | |
| 4,804,052 A * | 2/1989 | Griffen | 177/25.14 |
| 4,957,178 A * | 9/1990 | Mills | 177/134 |
| 5,002,141 A * | 3/1991 | Loshbough et al. | 177/210 FP |
| 5,004,058 A * | 4/1991 | Langford et al. | 177/25.13 |
| 5,546,796 A * | 8/1996 | Taniguchi | 73/146 |
| 5,606,516 A * | 2/1997 | Douglas et al. | 702/104 |
| 5,959,259 A * | 9/1999 | Beshears et al. | 177/132 |
| 5,998,741 A * | 12/1999 | Beshears et al. | 177/133 |
| 6,137,066 A * | 10/2000 | Wånelid | 177/45 |
| 6,459,050 B1* | 10/2002 | Muhs et al. | 177/133 |
| 6,481,298 B1* | 11/2002 | Stevens et al. | 73/862.381 |
| 6,675,077 B2 | 1/2004 | Dembosky et al. | |
| 7,058,488 B2* | 6/2006 | Kemp et al. | 73/669 |
| 7,355,508 B2 | 4/2008 | Mian et al. | |
| 7,375,293 B2* | 5/2008 | Beshears et al. | 177/25.13 |
| 8,080,742 B2* | 12/2011 | Bergan et al. | 177/132 |
| 2009/0125273 A1 | 5/2009 | Hively et al. | |
| 2011/0277560 A1* | 11/2011 | Barnett et al. | 73/862.045 |
| 2013/0220709 A1* | 8/2013 | Trakhimovich | 177/134 |

FOREIGN PATENT DOCUMENTS

| | | | |
|---|---|---|---|
| EP | 1793211 A2 | 6/2007 | |
| EP | 2062794 | 5/2009 | |
| WO | WO 9221009 A1 * | 11/1992 | G01G 19/03 |
| WO | WO 2013043701 A1 * | 3/2013 | G01G 19/02 |

OTHER PUBLICATIONS

Ahn, International Search Report and Written Opinion for International Application No. PCT/US2012/056084, Feb. 26, 2013, 10 pages.

Koch, European Patent Office Supplementary Search Report for Application No. EP 12 83 4008, Jun. 15, 2015, 6 pages.

* cited by examiner

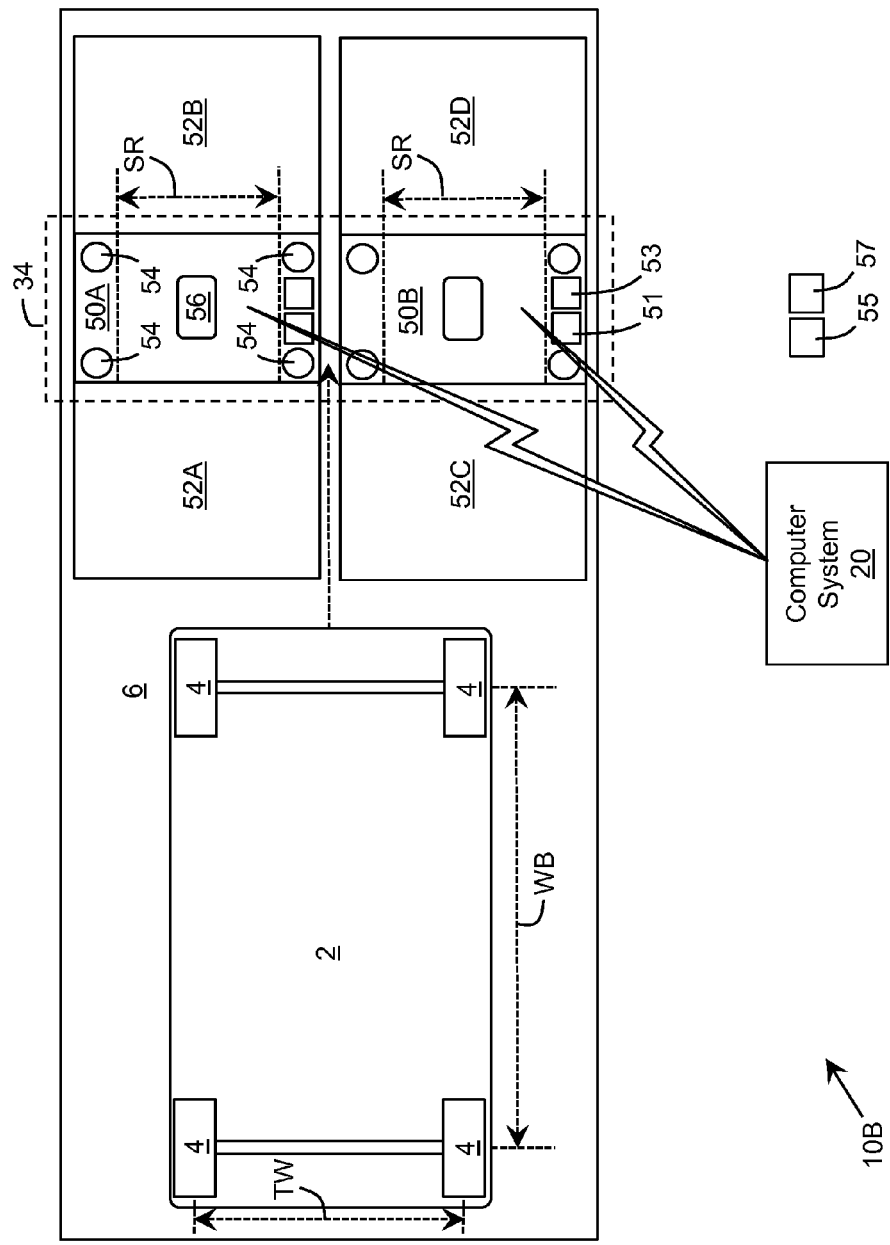

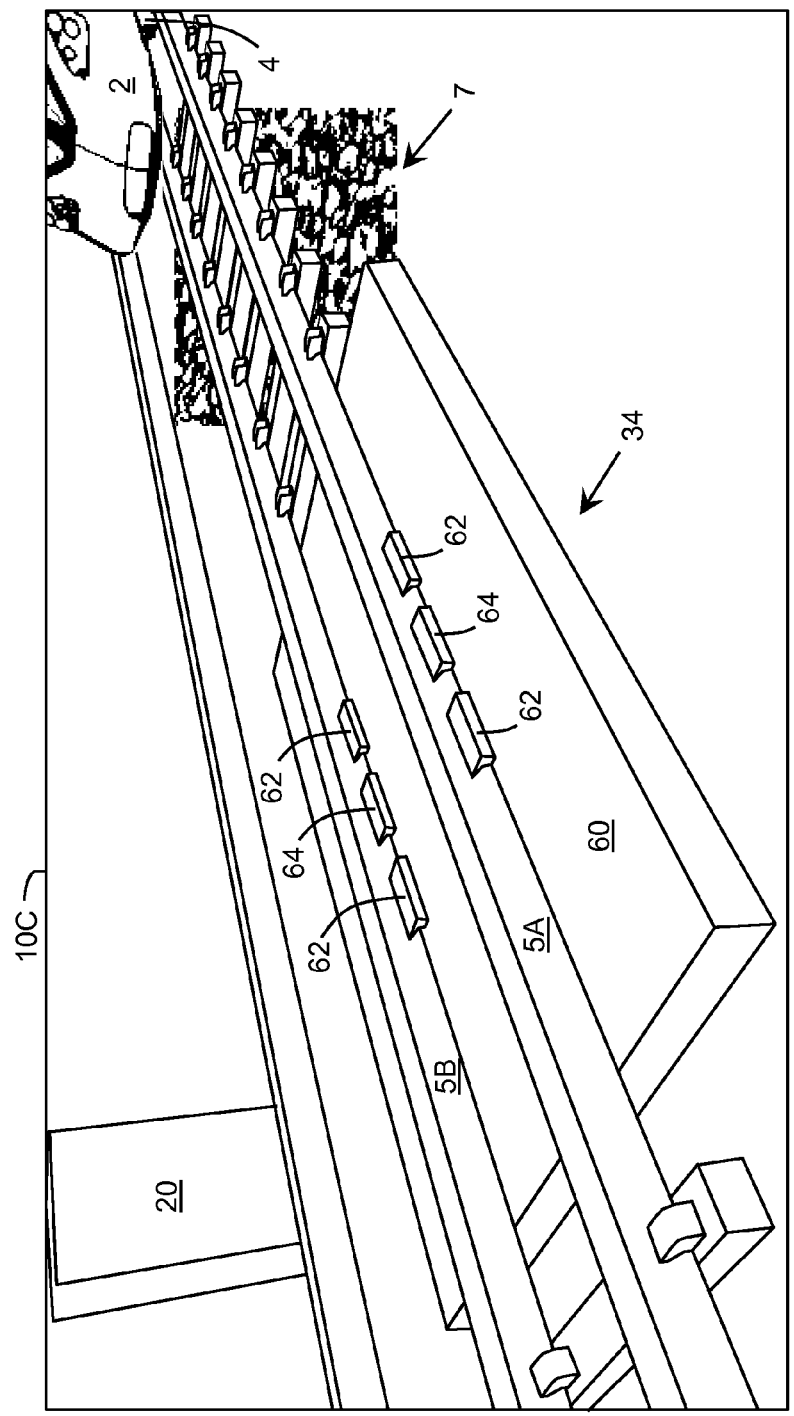

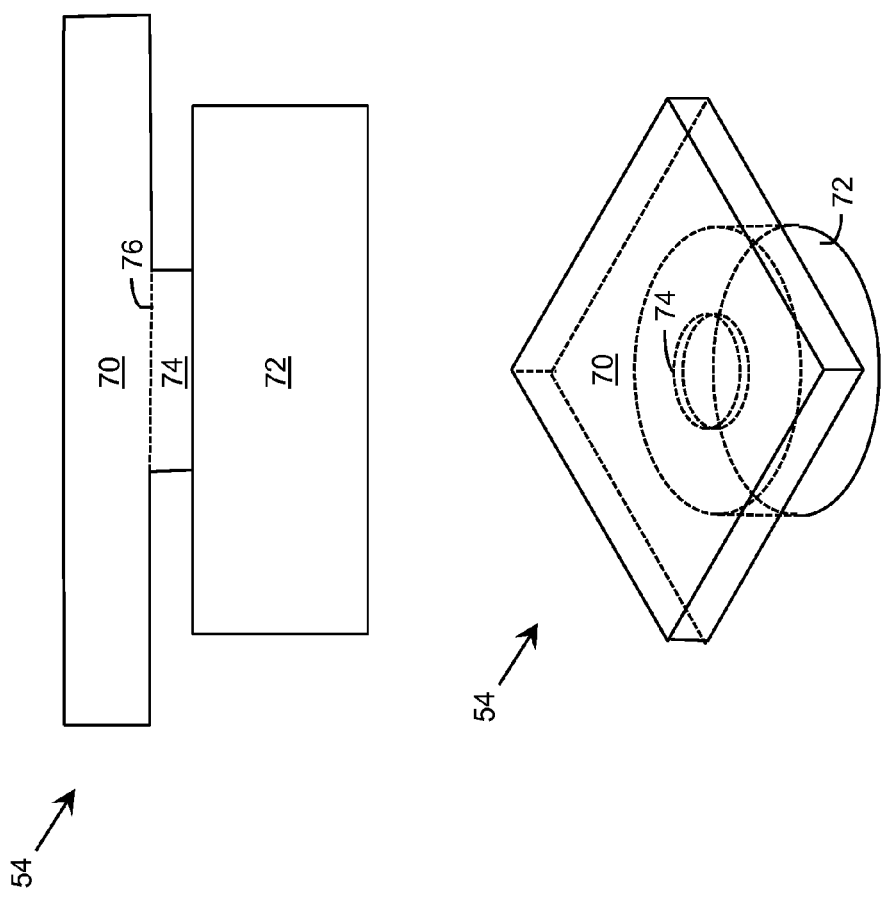

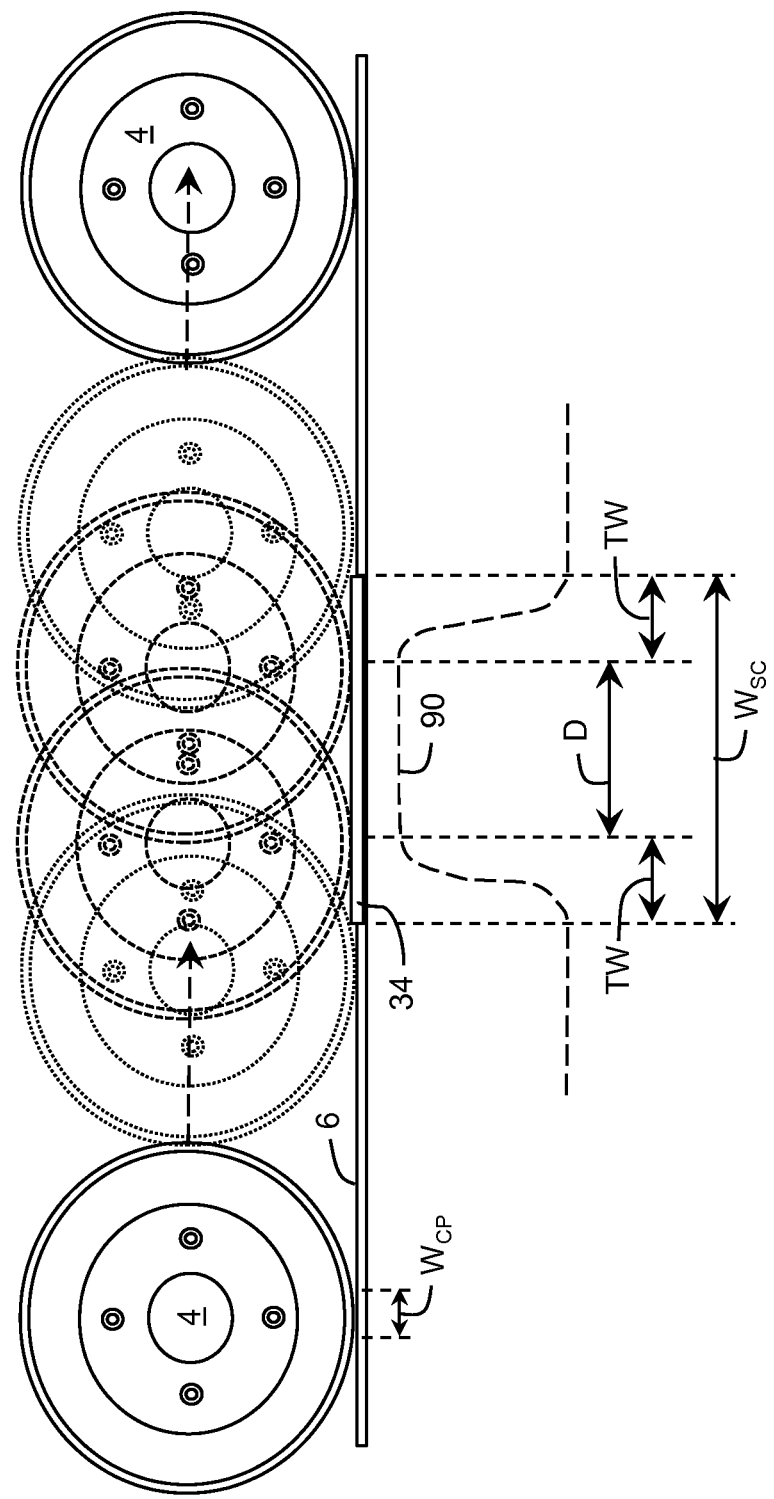

OBJECT EVALUATION ACCOUNTING FOR MOTION-RELATED DYNAMIC FORCES

REFERENCE TO RELATED APPLICATIONS

The current application claims the benefit of U.S. Provisional Application No. 61/573,178, titled "Accurate Weigh-in-Motion Device, System and Method," which was filed on 19 Sep. 2011, and which is hereby incorporated by reference.

GOVERNMENT LICENSE RIGHTS

This invention was made with Federal government support under SBIR Contract No. W913E5-10-C-0004 awarded by the Department of Defense. The government has certain rights in the invention.

TECHNICAL FIELD

The disclosure relates generally to weighing vehicles in motion, and more particularly, to an improved solution for accurately weighing a vehicle while it is in motion.

BACKGROUND ART

To date, weigh-in-motion (WIM) approaches attempt to weigh a vehicle while it is in motion by considering the vertical forces generated by the vehicle. In order for such approaches to be reliable, various attributes of the vehicle design need to be known ahead of time, such as the precise loading of each wheel, center of gravity, and/or the like. In practice, such knowledge cannot be accurately determined and utilized ahead of time, particularly in real-time applications. More importantly, adding a significant load to a vehicle can result in an often dramatic change to the attributes.

For current WIM systems to be usable, various restrictions on the installation and use of the system are applied. These restrictions include: requiring absolutely smooth and level pavement before and after the WIM system; requiring no turning, braking, or acceleration by the vehicle; limiting speeds to a specific target range; etc. Even with such restrictions, the accuracy of current WIM systems fail to meet reasonable requirements in many operating conditions. For example, the accuracy of: piezoelectric load (pressure) sensors is ±10%; bending plates is ±8%; and single load cells is ±6%. For a 60,000 pound vehicle, these errors can range from 3,600 pounds up to 6,000 pounds—equivalent to the weight of a large sport utility vehicle.

One approach seeks to account for oscillations that occur as a vehicle traverses a weighing system in order to provide a more accurate weight measurement. In this approach, oscillations in a single dimension are accounted for, but accurate measurement continues to require that the vehicles travel at low constant speeds with no turning or other factors.

Even across a relatively small subsection of vehicles, numerous parameters that can affect an accuracy of measuring the weight of the vehicle can vary substantially. For example, the table below illustrates the variation in several characteristics for vehicles weighing between roughly one and three tons.

| | |
|---|---|
| Wheelbase | 2,347-4,000 mm |
| Track width | 1,416-2,000 mm |
| Center of Gravity (Z) | 540-1,000 mm |
| Center of Gravity (X) | 1,063-1,478 mm |
| Tire width | 185-315 mm |
| Front to back weight ratio | 53/47 to 66/34 |
| Front wheel weight range | 482-1784 pounds |
| Rear wheel weight range | 433-1288 pounds |

When considering all types of commercial vehicles, which can range in size from a panel truck to a double-length tractor trailer, the variability in these characteristics becomes immense.

SUMMARY OF THE INVENTION

Aspects of the invention provide a solution for evaluating an object, which accounts for various motion-related dynamic forces. In an embodiment, the object is a vehicle and the evaluation includes determining a set of static weights corresponding to the vehicle as it moves through a sensing element. The sensing element can include a load plate with vertical force sensing devices and horizontal force sensing devices located below the load plate. Analysis of measurement data acquired by the force sensing devices can enable calculation of the set of static weights corresponding to the vehicle.

A first aspect of the invention provides a system comprising: a sensing element including: a rectangular load plate; a plurality of vertical force sensing devices, wherein a vertical force sensing device is located below the rectangular load plate adjacent to each of four corners of the rectangular load plate; and a set of horizontal force sensing devices located below the rectangular load plate; and a computer system configured to perform a method of evaluating an object, the method including: obtaining load measurement data from the plurality of vertical force sensing devices and the set of horizontal sensing devices, wherein the load measurement data corresponds to a load applied to the rectangular load plate; processing the load measurement data to identify a horizontal component of the load and a vertical component of the load; and evaluating the object based on the horizontal and vertical components of the load.

A second aspect of the invention provides a system comprising: at least one pair of sensing elements located adjacent to each other, each sensing element including: a rectangular load plate; a plurality of vertical force sensing devices, wherein a vertical force sensing device is located below the rectangular load plate adjacent to each of four corners of the rectangular load plate; and a set of horizontal force sensing devices located below the rectangular load plate; and a computer system configured to perform a method of weighing a vehicle traveling over the at least one pair of sensing elements, wherein all wheels on an axle of the vehicle concurrently travel over the rectangular load plates of the at least one pair of sensing elements, the method including: obtaining load measurement data from the plurality of vertical force sensing devices and the set of horizontal sensing devices for each axle of the vehicle while the vehicle travels over the at least one pair of sensing elements; processing the load measurement data to identify a horizontal component of a load resulting from the passage of each wheel of the vehicle and a vertical component of the load; and calculating a set of static weights corresponding to the vehicle based on the horizontal and vertical components of the load.

A third aspect of the invention provides a method of weighing a vehicle in motion, the method comprising: obtaining load measurement data from a plurality of vertical force sensing devices and a set of horizontal sensing devices for each axle of the vehicle while the vehicle travels over a set of load plates physically connected to the plurality of vertical force sensing devices and the set of horizontal sensing devices; processing the load measurement data to identify a horizontal component of a load resulting from the passage of each wheel of the vehicle and a vertical component of the load; and calculating a static weight for at least one of: an axle of the vehicle or the vehicle based on the horizontal and vertical components of the load.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 3A and 3B show top views of illustrative WIM environments according to embodiments.

FIG. 4 shows an illustrative WIM environment for weighing a rail vehicle according to an embodiment.

FIGS. 5A and 5B show illustrative designs for a vertical load sensor and a horizontal load sensor, respectively, according to an embodiment.

FIG. 6 shows various illustrative measurements of a wheel traveling over a sensing component according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
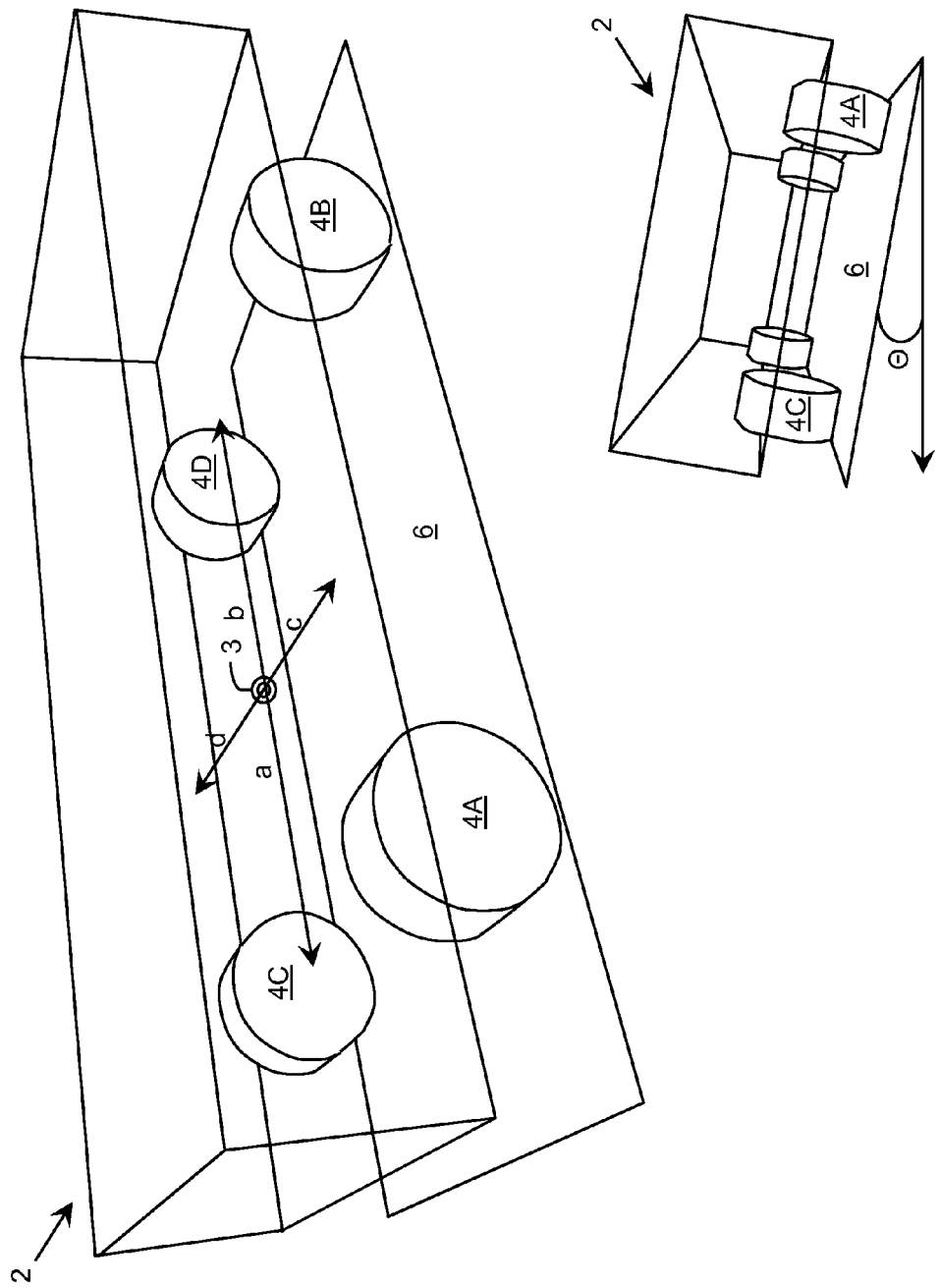
FIG. 1 illustrates various parameters and forces relevant to determination of wheel weight and vehicle weight in a dynamic system according to an embodiment.

As indicated above, aspects of the invention provide a solution for evaluating an object, which accounts for various motion-related dynamic forces. In an embodiment, the object is a vehicle and the evaluation includes determining a set of static weights corresponding to the vehicle as it moves through a sensing element. The sensing element can include a load plate with vertical force sensing devices and horizontal force sensing devices located below the load plate. Analysis of measurement data acquired by the force sensing devices can enable calculation of the set of static weights corresponding to the vehicle. As used herein, unless otherwise noted, the term "set" means one or more (i.e., at least one) and the phrase "any solution" means any now known or later developed solution.

As described herein, to date, weigh-in-motion (WIM) approaches are limited in the type of vehicle and/or movements of a vehicle that are allowed during the weighing process in order to provide for accurate measurements of a vehicle's weight. The inventors propose to provide a WIM solution, which detects and accounts for various factors, such as dynamic forces acting on a vehicle, that influence the apparent static weights corresponding to the vehicle during its passage over a set of sensors and cause significant errors in prior art approaches. In an embodiment, the solution will account for various horizontal forces, which have largely been unaccounted for in the prior art approaches.

In this manner, aspects of the invention can provide a WIM solution, which can provide accurate (e.g., within approximately one percent or better) measurement of the weight of various types of vehicles without knowledge of the make and/or model of the vehicle, let alone its cargo load, passenger weight distribution, and/or the like, prior to its entry into a sensor area for the WIM solution. Aspects of the invention can provide accurate weight measurements for vehicles traveling at a variety of speeds, performing any of various normal roadway maneuvers, and spanning a considerable range of characteristics.

A solution described herein can be implemented in various types of applications. In an embodiment, a WIM system is provided for screening commercial vehicles traveling on a roadway for selection for further inspection or other purposes. In another embodiment, a WIM system is provided for monitoring vehicles entering a sensitive area to determine, for example, if the vehicle is carrying dangerous or illicit cargo (e.g., an improvised explosive device (IED)).

A solution described herein can incorporate, for example, one or more of the following innovations: three axis sensing, which enables the solution to account for both static and dynamic forces associated with a moving vehicle; compensation for non-constant velocity of the vehicle; error reduction in all three dimensions with variable vehicle behavior in multiple modes; multiple sensors to acquire data corresponding to vehicle parameters affecting the weight measurement (e.g., speed, wheel base, track width, and/or the like) and the use of such data in calculating the vehicle weight; inclusion of sensor(s) to acquire data corresponding to environmental factors affecting the weight measurement (e.g., tiltmeter, anemometer, and/or the like) and the use of such data in calculating the vehicle weight; and/or the like.

FIG. 1 illustrates various parameters and forces relevant to determination of wheel weight and vehicle weight in a dynamic system according to an embodiment. As illustrated, in general, a vehicle 2 rides on a set of wheels 4A-4D. While four wheels 4A-4D on two axles are shown for the vehicle 2, it is understood that the vehicle 2 can include any number of wheels and any number of axles. Furthermore, it is understood that the wheels 4A-4D can comprise any type of wheels including, for example, roadway wheels (e.g., tires), rail wheels, airplane wheels, and/or the like. To this extent, it is understood that the vehicle 2 can comprise any type of vehicle 2 capable of traveling along a surface using any type of wheel-based solution.

Regardless, when the vehicle is stationary, the static weight of the vehicle 2 is distributed across the wheels 4A-4D as static wheel weights for the wheels 4A-4D. Determination of the static wheel weight on a specific wheel can be determined by calculations dependent on the total weight of the vehicle 2 and the location of a center of gravity (CG) 3 for the vehicle 2. For example, each wheel 4A-4D can be located a certain distance from the CG 3 as measured along a track width of the vehicle 2 (indicated as distances a, b) and a certain distance from the CG 3 as measured along a wheelbase of the vehicle 2 (indicated as distances c, d). The following equation can be used to calculate a static wheel weight on the wheel 4A, $WT_{4A}$:

$$WT_{4A} = WT_0(d/(d+c))(b/(b+a))$$ Equation 1 where $WT_0$ is the total static weight of the vehicle 2. For a vehicle 2 having four wheels 4A-4D as illustrated, an effective track width of the vehicle 2, TW, is the sum of distances c and d and an effective wheelbase length of the vehicle 2, WB, is the sum of distances a and b. In this case, Equation 1 can be rewritten as:

$$WT_{4A} = WT_0 (d/TW)(b/WB) \quad \text{Equation 2}$$

While these equations presume the same track width TW for each axle, it is understood that the equations can be readily changed to accommodate axles of differing track widths TW.

In a dynamic context, e.g., when the vehicle 2 is moving, any combination of several factors can cause the apparent weight on a wheel 4A-4D to differ from the static weight on the wheel 4A-4D. For example, the vehicle 2 may be under an acceleration force, which can cause the vehicle 2 to tilt back, thereby increasing the apparent weight on the rear wheels of the vehicle 2. Similarly, the vehicle 2 may be under a deceleration force (e.g., due to braking), which can increase the apparent weight on the front wheels of the vehicle 2. Even a relatively low level of acceleration/deceleration can produce a several percent difference in the perceived weight on a wheel 4A-4D. Additionally, a vehicle 2 that is turning will exert lateral steering forces (which can be in either direction). It is understood that as used herein, the term "acceleration" is inclusive of increasing speed, decreasing speed, and changes in direction of the vehicle 2.

Various other forces can be present regardless of any operation of the vehicle 2. For example, any rolling wheel 4A-4D is subject to a rolling friction force between the wheel 4A-4D and a surface 6 on which it is rolling. Furthermore, any moving vehicle 2 will encounter some level of aerodynamic resistance and wind forces can act on the vehicle 2 from any direction. In addition, the surface 6 may be at an angle, $\Theta$, which will cause a tilting apparent lateral force equal to a product of an actual vertical weight and the sine of $\Theta$ and the apparent vertical force perceived at the surface 6 will be equal to a product of the actual vertical weight and the cosine of $\Theta$. While not shown, it is understood that the surface 6 also could be on an incline/decline, which would result in similar forces as the lateral force described herein.

As indicated by the above discussion, there are a wide variety of forces that may affect the apparent wheel weights of a moving vehicle 2. A fully detailed statement of the problem would also need to include other factors, such as suspension interaction (e.g., camber, oscillation, etc.), cargo/passenger weight distribution shifting, and/or the like. To this extent, a general rigorous solution to such a fully detailed statement of the problem may not be feasible. Additionally, the discussion above may be ill-posed since the resultant forces produced by small changes in vehicle parameters (such as a location of the center of gravity 3) can be large, resulting in a great sensitivity to noise in the data. Such noise can result in large errors, which can cause large errors in estimation of the static weights. Furthermore, the discussion is underdetermined because the number of known variables exceeds the number of independent equations describing the problem.

Figure 2:
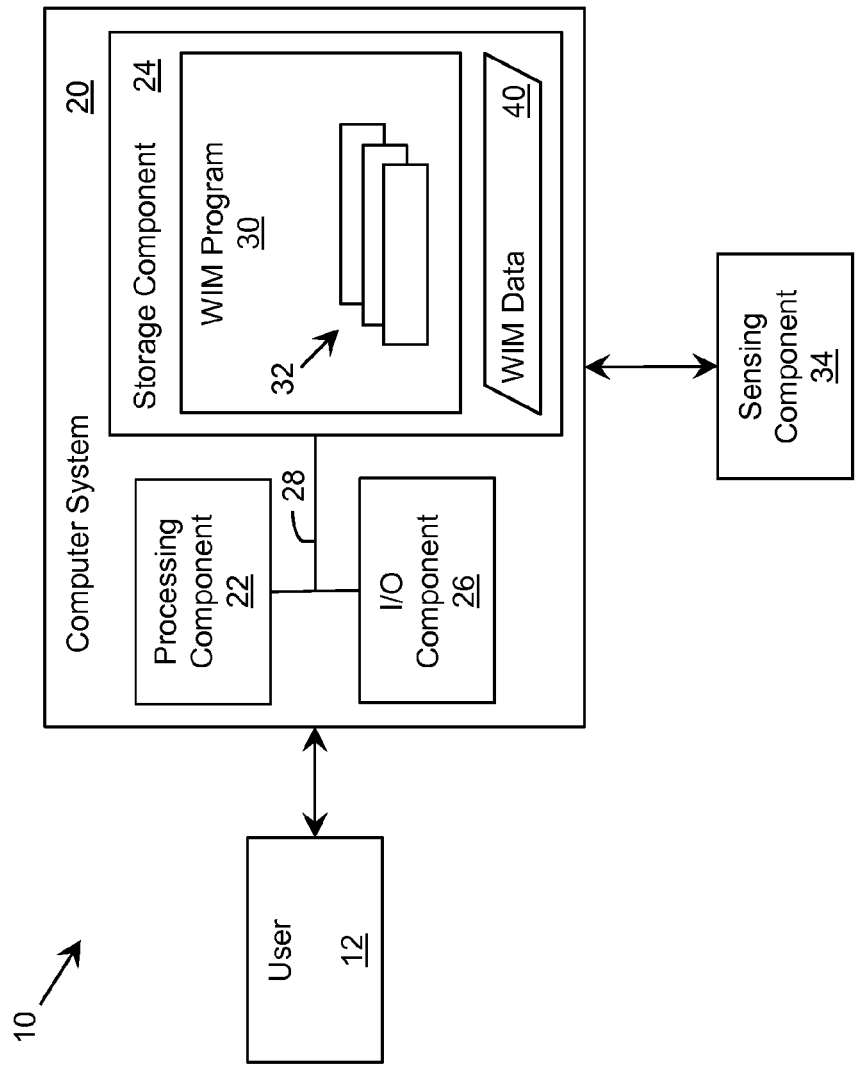
FIG. 2 shows an illustrative environment for weighing a vehicle in motion according to an embodiment.

The inventors propose a practical WIM solution capable of reaching reasonable accuracy (e.g., one percent or better) using a combination of one or more new approaches and technologies. FIG. 2 shows an illustrative environment 10 for weighing a vehicle in motion according to an embodiment. To this extent, environment 10 includes a computer system 20 that can perform a process described herein in order to weigh the vehicle as it travels past a sensing component 34 as described herein. In particular, the computer system 20 is shown including a WIM program 30, which makes the computer system 20 operable to weigh the vehicle by performing a process described herein.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the WIM program 30, which is at least partially fixed in the storage component 24. While executing program code, the processing component 22 can process data, which can result in reading and/or writing transformed data from/to the storage component 24 and/or the I/O component 26 for further processing. The pathway 28 provides a communications link between each of the components in the computer system 20. The I/O component 26 can comprise one or more human I/O devices, which enable a human user 12 to interact with the computer system 20 and/or one or more communications devices to enable a system user 12 and/or a sensing component 34 to communicate with the computer system 20 using any type of communications link. To this extent, the WIM program 30 can manage a set of interfaces (e.g., graphical user interface(s), application program interface, and/or the like) that enable human and/or system users 12 to interact with the WIM program 30. Furthermore, the WIM program 30 can manage (e.g., store, retrieve, create, manipulate, organize, present, etc.) the data, such as the WIM data 40, using any solution.

In any event, the computer system 20 can comprise one or more general purpose computing articles of manufacture (e.g., computing devices) capable of executing program code, such as the WIM program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the WIM program 30 can be embodied as any combination of system software and/or application software.

Furthermore, the WIM program 30 can be implemented using a set of modules 32. In this case, a module 32 can enable the computer system 20 to perform a set of tasks used by the WIM program 30, and can be separately developed and/or implemented apart from other portions of the WIM program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Additionally, it is understood that some of the functionality discussed herein may not be implemented or additional functionality may be included as part of the computer system 20.

When the computer system 20 comprises multiple computing devices, each computing device can have only a portion of the WIM program 30 fixed thereon (e.g., one or more modules 32). However, it is understood that the computer system 20 and the WIM program 30 are only representative of various possible equivalent computer systems that may perform a process described herein. To this extent, in other embodiments, the functionality provided by the computer system 20 and the WIM program 30 can be at least partially implemented by one or more computing devices, each of which includes any combination of general and/or specific purpose hardware with or without program code. In each embodiment, the hardware and program code, if included, can be created using standard engineering and programming techniques, respectively.

Regardless, when the computer system 20 includes multiple computing devices, the computing devices can communicate over any type of communications link. Furthermore, while performing a process described herein, the computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

Figure 3A:
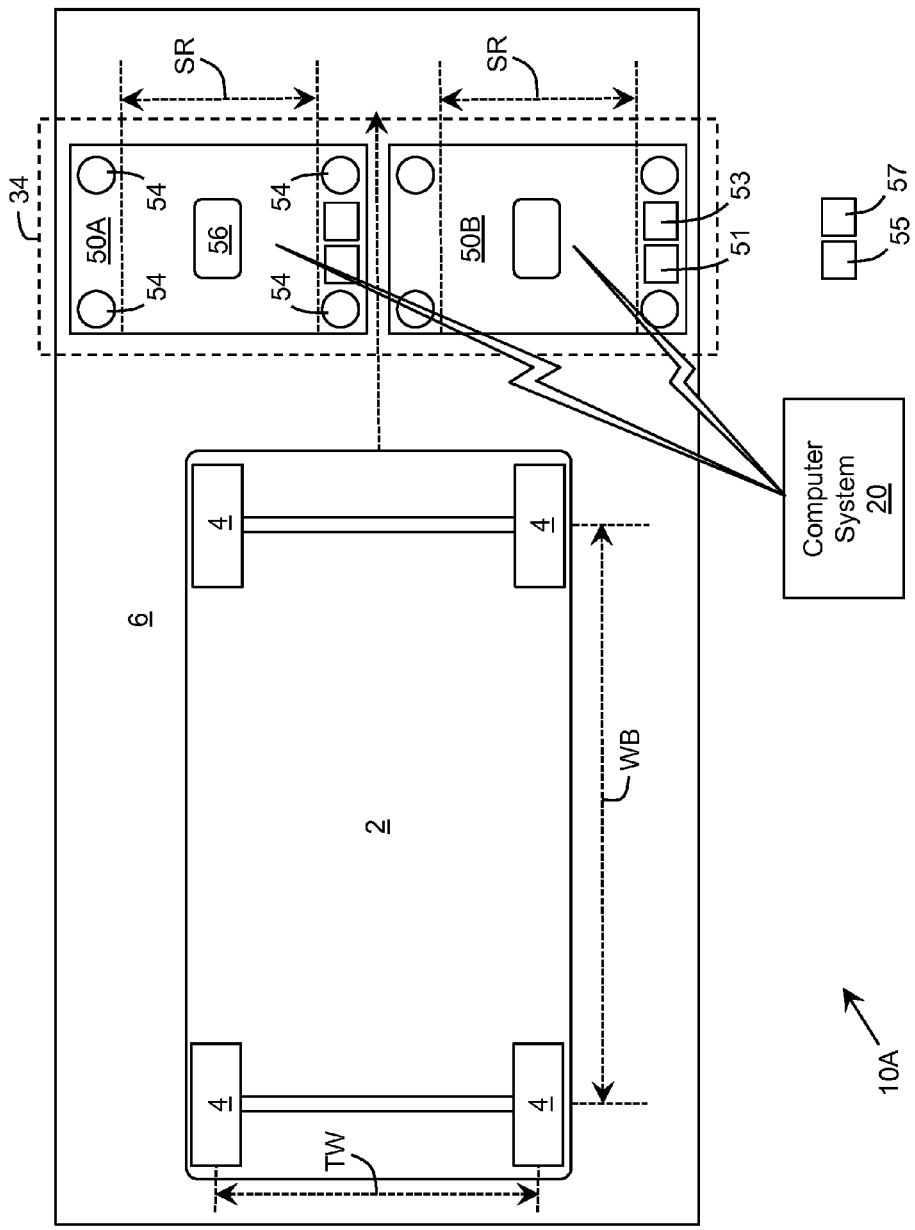

As discussed herein, the WIM program 30 enables the computer system 20 to weigh a vehicle 2 (FIG. 1) as it moves past a sensing component 34. To this extent, FIGS. 3A and 3B show top views of illustrative WIM environments 10A, 10B according to embodiments. Each WIM environment 10A, 10B includes a sensing component 34 comprising a pair of sensing elements 50A, 50B located in a path of travel of a vehicle 2 traveling along a surface 6. Each sensing element 50A, 50B can have a corresponding sensing region SR within which wheels 4 of the target vehicle 2 should roll over the sensing element 50A, 50B. The sensing elements 50A, 50B are located in the path of travel of the wheels 4 and dimensioned such that over an entire range of possible wheelbases WB and track widths TW for the target vehicle 2, all wheels 4 on any axle of the vehicle 2 will travel on one of the sensing elements 50A, 50B in a corresponding sensing region SR as the vehicle 2 travels past the sensing component 34. Additionally, only the wheels 4 on a single side of a single axle of the vehicle 2 will be present on a sensing element 50A, 50B at any given time. While aspects of the invention are shown and described with respect to vehicles 2 having two axles, each with a single wheel 4 on either side, it is understood that aspects of the invention can be directed to vehicles 2 having any number of axles and any number of wheels 4 on a side of an axle. For multiple wheels on a single side of an axle, the sensing elements 50A, 50B can be dimensioned such that both wheels travel across the sensing elements 50A, 50B within the sensing region SR.

Furthermore, the sensing elements 50A, 50B can have a width (e.g., as measured in a direction the vehicle 2 is traveling) that is sufficient for the sensing device(s) included in each sensing element 50A, 50B to acquire at least a target number of measurements for vehicles 2 traveling at any speed of travel within a range of speeds of travel. The sensing elements 50A, 50B can be formed of any type of material capable of supporting a vehicle 2 having a weight within a target range of vehicle weights to be processed by the WIM environment 10A, 10B, such as metal. In an embodiment, the sensing elements 50A, 50B are configured to acquire measurement data for vehicles 2 weighing between one and three tons, having the characteristics described herein, traveling up to thirty miles per hour, and having a maximum acceleration (deceleration) of approximately 0.2 times the gravitational constant. In this case, a nominal width of each sensing element 50A, 50B in the direction of travel can be approximately twenty-two inches and a length in the transverse direction can be approximately thirty-seven inches. The sensing elements 50A, 50B can be configured to acquire measurement data at approximately four kilohertz, which can provide at least approximately ninety data points for each wheel 4 of a vehicle 2 traveling at the maximum speed through the sensing region SR.

Uncertainty in the measurement data acquired by the set of sensing devices included in each sensing element 50A, 50B can be caused by an abrupt transition between the surface 6 and a top surface of the sensing elements 50A, 50B. Such a transition can cause a substantial spike in acceleration and oscillation forces, and also can result in damage to the sensing element 50A, 50B. In the WIM environment 10A, the sensing elements 50A, 50B are emplaced in the surface 6 such that a top surface of the sensing elements 50A, 50B is substantially level with the surface 6, thereby providing substantially flat transitions for the wheels 4 of the vehicle 2 as they roll from the surface 6 to the sensing element 50A, 50B and from the sensing element 50A, 50B to the surface 6.

Alternatively, as shown in FIG. 3B, the top surface of the sensing elements 50A, 50B can be located at a different level than the surface 6, e.g., as part of a portable or temporary emplacement of the sensing elements 50A, 50B on the surface 6. In this case, the WIM environment 10B can include a plurality of ramps 52A-52D to provide a substantially smooth transition to/from the surface of each sensing element 50A, 50B. For example, the plurality of ramps 52A-52D can be configured to provide a lead-in to and lead-out from the sensing elements 50A, 50B that are sufficiently gradual and gentle so as to minimize any oscillations and transient signals that are added due to the physical set up of the sensing elements 50A, 50B themselves. The length and grade of the ramps 52A-52D can be selected based on the height of the sensing elements 50A, 50B and one or more attributes of the vehicles 2 traveling past the sensing elements 50A, 50B using any solution. In an embodiment, the ramps 52A-52D can be approximately six feet long for every one inch of height with the ramp/road and the ramp/sensing element interfaces having shapes contoured/blended to reduce (e.g., minimize) an acceleration shock, which can cause transient forces due to excitation of the suspension of the vehicle 2. The ramps 52A-52D can be formed of any suitable material, such as metal, high strength polymer, and/or the like. Furthermore, the ramps 52A-52D and/or the sensing elements 50A, 50B can be affixed to the surface 6 by, for example, a high friction or a "toothed" contact surface.

Regardless, each sensing element 50A, 50B includes a set of sensing devices, each of which can acquire data corresponding to the vehicle 2 as it passes over the sensing element 50A, 50B and communicate data corresponding to the vehicle 2 for processing by the computer system 20 using any wired and/or wireless communications solution. In an embodiment, the set of sensing devices for each sensing element 50A, 50B includes at least one vertical force sensing device 54 and at least one horizontal force sensing device 56. In a further embodiment, each sensing element 50A, 50B includes four vertical force sensing devices 54, one of which is located at each of the four corners of the sensing element 50A, 50B, and one horizontal force sensing device 56 located in a central portion of the sensing element 50A, 50B.

It is understood that each sensing element 50A, 50B in a WIM environment 10A, 10B can be configured in a substantially identical manner. Alternatively, a WIM environment 10A, 10B can include sensing elements 50A, 50B having a plurality of different configurations of sensing devices. For example, a WIM environment 10A, 10B can include multiple sensing components 34, each of which includes a pair of sensing elements 50A, 50B having the same configuration of sensing devices, which can be the same or differ from the configuration of the other sensing component(s) 34. When multiple sensing components 34 are included in an environment 10A, 10B a spacing between the sensing components 34 can be selected based on a range of acceptable wheelbases WB for the target vehicles 2. For example, the spacing can be selected such that the wheels 4 from both axles of the vehicle 2 are substantially concurrently traveling over the sensing elements 50A, 50B of each sensing component 34. While conceptually shown near the surface 6 in close proximity to the sensing components 34, it is understood that the computer system 20 can be located anywhere. To this extent, in an embodiment, one or both of the sensing elements 50A, 50B can include a computing device of the computer system 20.

In an embodiment, the sensing device(s) in each sensing element 50A, 50B of the environment 10A, 10B can be configured to communicate with the computer system 20 using a wireless communications solution. Furthermore, the sensing device(s) can operate without requiring wiring external from the sensing element 50A, 50B (e.g., using battery power). Attributes of the surface 6, the sensing element 50A, 50B, and/or the deployment environment may vary in various deployments and/or over time. These variations can impact the measurement data acquired by the sensing device(s). In a portable/temporary emplacement, such as that shown in environment 10B, such variations can be unpredictable. To this extent, the sensing component 34 can include one or more ancillary sensing devices for acquiring data corresponding to the deployment location and/or environment.

For example, temperature can affect the behavior of various sensing devices, such as load cells. Furthermore, temperature can affect a stiffness and response of various components of a suspension of a vehicle 2. To this extent, a sensing element 50A, 50B can include one or more temperature sensors 51, which can provide temperature data for processing by the computer system 20 as part of a WIM process described herein. Similarly, a sensing element 50A, 50B can include a tiltmeter 53. A tilt of a surface of the sensing element 50A, 50B as small as a half of degree can introduce a difference of approximately one percent in the measured weight of a vehicle 2. The tiltmeter 53 can acquire and provide data corresponding to a difference between the angle of the surface of the sensing element 50A, 50B and the horizontal level to the computer system 20, which can use the data as part of a WIM process described herein. In an embodiment, the temperature sensor 51 and/or the tiltmeter 53 are affixed to a surface of a load plate of the sensing element 50A, 50B.

Furthermore, the sensing component 34 can include an anemometer 55 and a wind direction sensor 57 for acquiring data corresponding to the wind speed and direction, which can be provided to the computer system 20 for processing. The computer system 20 can use the wind data to quantify and account for wind effects on the measurement data acquired by the sensing component 34, which can affect the aerodynamic component. For example, if the wind is blowing from the rear of the vehicle 2, the perceived aerodynamic effect can drop off significantly. Rather than being merely counterbalancing forces, a wind from the rear of a vehicle 2 can effectively drop an apparent velocity of the vehicle 2. As an example, a vehicle 2 traveling at sixty miles per hour may normally experience one hundred twenty pounds of aerodynamic resistance. However, with a rear wind of approximately thirty miles per hour, the effective velocity of the vehicle 2 drops to thirty miles per hour. As aerodynamic forces increase by a square of the speed, a reduction by a factor of two in effective velocity will result in a reduction by a factor of four in resistance. To this extent, the computer system 20 can account for wind coming from any direction, which can affect the measurement data acquired by the sensing elements 50A, 50B. In an embodiment, the anemometer 55 and/or the wind direction sensor 57 are located transversely from the sensing element 50A, 50B at a distance of at least approximately three feet from the surface 6. Furthermore, the anemometer 55 and/or the wind direction sensor 57 can be located at a height above the surface 6, which is typical of a vertical center of gravity location of the target vehicles 2 to be measured using the sensing component 34.

While the vehicle 2 is shown including four wheels 4 on two axles, it is understood that an embodiment can be directed to any type of vehicle 2 having any number of wheels 4 in any configuration. Furthermore, while the environments 10A, 10B are directed to measuring a vehicle 2 traveling on a roadway, it is understood that an embodiment can be directed to other types of wheeled vehicles, such as a rail vehicle.

To this extent, FIG. 4 shows an illustrative WIM environment 10C for weighing a rail vehicle 2 according to an embodiment. The rail vehicle 2 can be any type of rail vehicle operating in various types of rail environments, such as freight, high speed transit, passenger/local transit, and/or the like. Furthermore, while the rail vehicle 2 is shown traveling along two rails 5A, 5B, it is understood that the rail vehicle can travel along any number of rails 5A, 5B.

In any event, the sensing component 34 is shown including a supporting foundation 60 on which a set of sensing devices 62, 64 are located. Each sensor 62, 64 can be placed such that it is located between a rail 5A, 5B and the supporting foundation 60. The supporting foundation 60 can be formed of any material having sufficient rigidity to not flex appreciably during the passage of the rail vehicles 2 of a train, unlike ordinary ballast 7, which permits the rails 5A, 5B to flex appreciably during the passage of the rail vehicles 2 of a train. In an embodiment, the supporting foundation 60 comprises reinforced concrete of a thickness and type normally used in constructing other similar supporting platforms, such as hard concrete "aprons" for railyard service shops, airport runways, and/or the like.

Each rail 5A, 5B is shown including a pair of vertical force sensing devices 62 with a horizontal force sensing device 64 there between. In this configuration, the sensing devices 62, 64 can acquire data corresponding to a weight of the rail vehicle 2 as each rail wheel 4 passes over the supporting foundation 60. Subsequently, the sensing devices 62, 64 can provide data corresponding to the weight of the rail vehicle 2 for processing by a computer system 20, which can be located a safe distance from the rails 5A, 5B. In an embodiment, a total spacing between the first and last sensing devices 62 on a given rail 5A, 5B is selected such that only a single rail wheel 4 will be located there between as the rail vehicle 2 passes through the sensing component 34. However, it is understood that an embodiment of the sensing component 34 can include any number of, type(s) of, and placement of sensing devices.

In an embodiment, each of the horizontal and vertical force sensing devices shown in FIGS. 3A, 3B, and 4 comprises a load sensor. In general, when subjected to real-world stresses containing both vertical and horizontal components, a load sensor can be vulnerable to "crosstalk." To this extent, in order to reliably apply computational methods to extract the static forces from the complex dynamic forces, it is desirable for the vertical and horizontal components of the stresses resulting from a load to be isolated from each other.

Figure 5B:
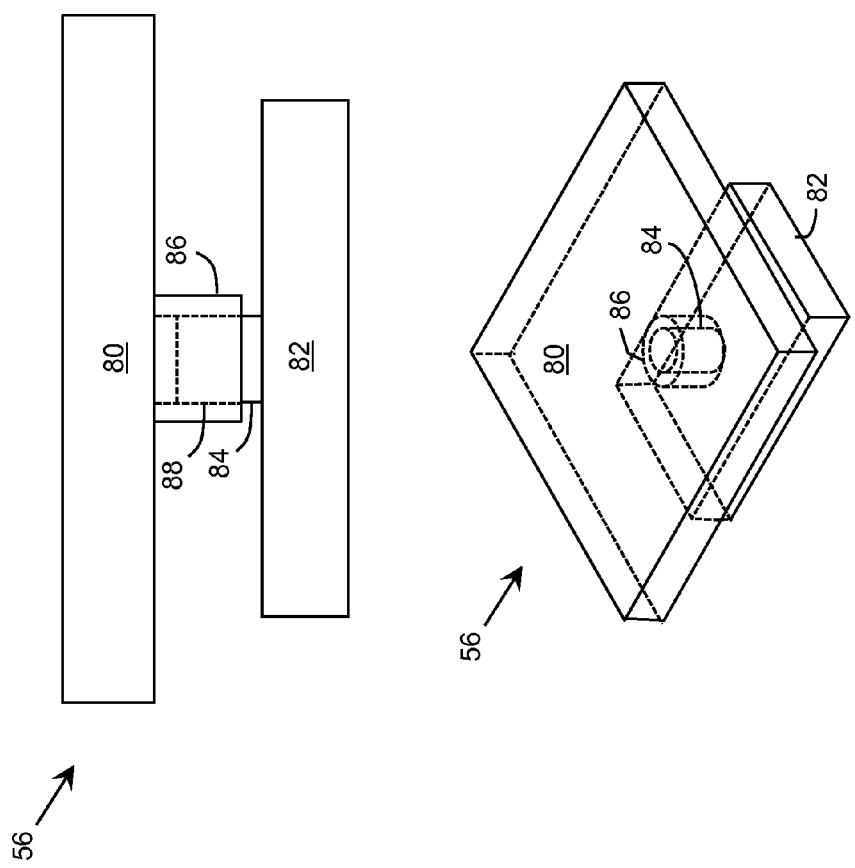

FIGS. 5A and 5B show illustrative designs for a vertical load sensing device 54 and a horizontal load sensing device 56, respectively, according to an embodiment. In particular, FIGS. 5A and 5B show side and projected views of the corresponding load sensing device 54, 56, respectively. As a wheel rolls over each load sensing device 54, 56, the load sensing device 54, 56 is subjected to a force having a vertical and a horizontal component. To this extent, each load sensing device 54, 56 is configured to limit an amount of crosstalk interference in the measurement data acquired by the corresponding load sensing device 54, 56.

In FIG. 5A, the vertical load sensing device 54 includes a load plate 70 on which the wheels 4 of a vehicle 2 roll as the vehicle 2 travels past the sensing component 34 (FIG. 2). Below the load plate 70 is a vertical (Z axis) load cell 72. The load cell 72 has a contact plate 74, which has an interface 76 with the load plate 70 that significantly reduces the horizontal load transferred to the vertical load cell 72. The load plate 70 can be constrained such that the load cells 72 only deflect under external forces and the deflection is on the order of approximately one to five mils maximum. For a load cell 72 formed of metal, the elasticity of the metal can cause the load cell 72 to spring back to an original position when the external forces are removed. As a result, substantially none of the horizontal component is transferred to the vertical load cell 72. However, there is no gap between the load plate 70 and the contact plate 74 in the vertical direction. As a result, the full vertical component of the force is transferred to and therefore transmitted as a measured vertical load by the vertical load cell 72.

In FIG. 5B, the horizontal load sensing device 56 includes a load plate 80 on which the wheels 4 of the vehicle 2 roll. Below the load plate 80 is a horizontal (X-Y axis) load cell 82. The load plate 80 and the load cell 82 are connected via an arm 84 projecting from the load cell 82 into a sleeve 86 connected to the load plate 80. The arm 84 and sleeve 86 are dimensioned such that the arm 84 can move up and down along the interface 88, but the arm 84 does not move horizontally with respect to the sleeve 86. Since the load plate 80 is able to move in the vertical direction with respect to the load cell 82, no appreciable vertical force experienced by the load plate 80 is transferred to the load cell 82. As no horizontal movement is permitted due to the arm 84/sleeve 86 interface, the full horizontal component of the force is transferred to and therefore transmitted as a measured horizontal load by the load cell 82.

As described herein, the load sensing devices 54, 56 can be implemented in an environment, such as WIM environments 10A (FIG. 3A), 10B (FIG. 3B). However, it is understood that the load sensing devices 54, 56 are only illustrative of various types of load sensors that can be utilized. For example, in a rail-based WIM environment 10B (FIG. 4), a portion of each rail 5A, 5B can act as the load plate. In this case, the load sensing devices 62, 64 can comprise a load cell, which is connected to the corresponding portion of the rail 5A, 5B using a connection solution similar to those described with respect to load sensing devices 54, 56. As the portion of the rail 5A, 5B comprises an elongated rectangular shape, a single vertical load sensing device 62 can be located below the rail 5A, 5B and define two adjacent "corners" of the rectangular load plate. Furthermore, it is understood that an amount of actual movement in any of the X, Y, Z directions is very small and does not imply or require a substantial allowance for movement. It also is understood that either of the interfaces 76, 88 can be lubricated, constructed with low friction surfaces, and/or the like. In any event, the computer system 20 (FIG. 2) can determine and account for forces caused by friction using an analytic solution, empirical solution, and/or the like.

Using an approach described with respect to the load sensing devices 54, 56, aspects of the invention permit the acquisition of accurate and independent measurement of the horizontal and vertical components of the force applied by the passing vehicle 2. It is understood that using similar approaches, other refinements are possible. For example, an embodiment can include load sensing devices that isolate the X and Y components of the force applied by the passing vehicle 2. Another embodiment can utilize a set of three-axis load sensing devices, which can be implemented without the interfaces allowing movement as described herein.

As described herein, knowledge of specific attributes and dimensions of a vehicle 2 are important for calculating the wheel 4 weights. However, in practice, information such as the vehicle speed, wheelbase, track width, and/or the like, is often not available for a vehicle 2 passing over the sensing component 34. In an embodiment, use of a particular configuration of the sensing devices in the sensing component 34 enables the computer system 20 (FIG. 2) to process data acquired by the sensing devices to extract several attributes of the vehicle 2 during or shortly after acquisition of the data.

For example, FIG. 6 shows various illustrative measurements of a wheel 4 traveling over a sensing component 34 according to an embodiment. As the wheel 4 travels along the surface 6 (from left to right in FIG. 6), it passes over the sensing component 34. The sensor component 34 comprises a known width, $W_{SC}$. While the wheel 4 must traverse the entire width $W_{SC}$, the wheel 4 is only fully on the sensing component 34 for some smaller distance, which is dependent on the width of the wheel contact patch, $W_{CP}$. The width of the wheel contact patch $W_{CP}$ can vary with tire inflation, loading, tire diameter and width, and/or the like. As a result, as the wheel 4 travels over the sensing component 34, it traverses a relatively short transition distance TW during which the wheel 6 transitions from the surface 6 to the sensing component 34, travels a distance D over which the wheel 4 is fully on the sensing component 34, and subsequently traverses a second, generally symmetrical transition distance TW as the wheel 4 returns to the surface 6.

As the wheel 4 rolls across the sensing component 34, the load on the sensing component 34 varies in a manner similar to a curve 90. In particular, the load increases as the wheel 4 traverses the initial transition width TW, reaches a substantially steady state as the wheel 4 traverses the distance D, and decreases as the wheel 4 traverses the second transition width TW as it returns to the surface 6. Note that while the transition widths TW are substantially the same, the corresponding portion of the curve 90 are not necessarily symmetric inverses of one another. For example, if the vehicle is braking while passing over the sensing component 34, the decreasing portion of the curve 90 may be longer and flatter as it will extend over a longer period of time than the earlier portion of the curve 90 during which the vehicle was not undergoing braking.

As described herein, the sensing component 34 can include various types of sensing devices for acquiring data corresponding to the wheel 4 and the corresponding vehicle, such as data corresponding to a load placed on the sensing component 34 by the wheel 4. In an embodiment, such sensing devices are configured to acquire the data at a high rate of sampling to permit a sufficient number of data points to be acquired by each sensing device during the passage of the wheel 4. For an ability to extract and remove dynamic components from measurements, an accurate measurement of the changes in the dynamic forces seen by the wheel 4 can be important. To acquire such measurements, a sample rate can be selected based on the expected frequencies of the target components. Using the Nyquist sampling theorem, a sample rate should be at least twice the highest frequency of interest, and it can be useful to permit some oversampling to allow for averaging and noise/error correction.

In an illustrative embodiment, the width $W_{SC}$ is approximately three feet and each transition width TW is approximately six inches, thereby making the distance D approximately two feet. For a vehicle traveling approximately sixty miles per hour, the wheel 4 will cross the distance D in approximately 0.0227 seconds (1/44 of a second). In this case, assuming a frequency of one hundred hertz for the maximum contributing component and Nyquist rate sampling with five times oversampling, a sampling rate of one thousand hertz is required, which will provide approximately twenty-two data points as the wheel 4 traverses the distance D. Such a sampling rate can be readily provided by various sensing devices and computing devices. Using sensing devices with higher sampling rates can enable faster vehicle travel over the sensing component 34.

Referring to FIGS. 3A and 6, the computer system 20 (FIG. 2) can derive a number of attributes of the vehicle 2 and wheels 4 from the data acquired by each sensing element 50A, 50B. For example, the computer system 20 can derive a location of the wheel 4 on the sensing element 50A, 50B based the load data acquired by each vertical force sensing device 54. In particular, when a wheel 4 is directly over a vertical force sensing device 54, the vertical force sensing device 54 will see substantially all of the load from the wheel 4, while the sensing devices 54 on the opposing side will see nearly none of the load. Similarly, if the wheel 4 passes directly between two of the vertical force sensing devices 54, each vertical force sensing device 54 will see approximately half of the load. To this extent, the computer system 20 can compare and evaluate the load changes seen on all four of the vertical force sensing devices 54 as a wheel 4 traverses the sensing element 50A, 50B to determine the location of the wheel 4, which can also identify the direction of travel of the wheel 4 over the sensing element 50A, 50B (e.g., straight across or at an angle). Since the relative locations of each sensing element 50A, 50B can be precisely known after installation, the computer system 20 can use a combination of the positions of two wheels 4 concurrently on each sensing element 50A, 50B to determine the track width TW of the vehicle 2.

The computer system 20 can determine a speed of the vehicle 2 based on an amount of time the wheel 4 takes to traverse the width $W_{SC}$. Since the width $W_{SC}$ is known, the speed calculation can be found by dividing the width $W_{SC}$ by the time it takes for the wheel 4 to traverse the width $W_{SC}$. By comparing the speed calculations for multiple axles of a vehicle 2, the computer system 20 can determine the acceleration of the vehicle 2. Furthermore, the computer system 20 can determine the wheelbase WB for the vehicle 2, e.g., from an average speed between the axles and the time between the wheels 4 of the axles traversing the sensing elements 50A, 50B.

The computer system 20 can use various attributes of the vehicle 2 to extract one or more dynamic components of the forces exerted by the vehicle 2. For example, aerodynamic forces (e.g., drag) vary with a square of the speed of the vehicle 2, e.g., a vehicle 2 experiencing thirty pounds of aerodynamic drag at thirty miles per hour will experience approximately one hundred twenty pounds of drag at sixty miles per hour. To this extent, by accurately calculating the speed of the vehicle 2, the computer system 20 can accurately remove aerodynamic factors from the measurement data. For lower speeds (e.g., between approximately five and approximately thirty miles per hour), the computer system 20 can use a plot of the curve 90 versus an amount of time for the wheel 4 to pass through the distance D to accurately estimate a speed of the vehicle 2 while it passed through the distance D. Furthermore, at the lower speeds, the effect of drag can be ignored.

For vehicles 2 traveling at lower speeds (e.g., between approximately five and approximately thirty miles per hour), it is possible for the vehicle 2 to undergo several changes of acceleration as the vehicle 2 passes the sensing component 34. For example, a shift of an automatic transmission can take approximately 0.4 seconds. A vehicle having a wheelbase WB of twelve feet and traveling at five miles per hour will take approximately two seconds for the wheels 4 to completely travel through a sensing component 34 having sensing elements 50A, 50B of widths of three feet. For a vehicle attempting to accelerate or decelerate quickly during this time, the transmission could theoretically shift up to four or five times (although the speeds required would likely preclude an average speed so low). Each shift can initiate accelerations of up to approximately 0.25 time gravitational acceleration for a short period.

As a result, to accommodate very low speed operation of the vehicles 2, an embodiment can include one or more other solutions for accounting for shifting, jerky braking or acceleration, and/or the like, which a vehicle 2 may undergo as it traverses the sensing component 34. For example, an embodiment can include an acoustic or radar-based speed measurement device, which acquires multiple measurements of the speed of a vehicle 2 as it travels past the sensing component 34. Such a speed measurement device also can be included for vehicles 2 traveling at higher speeds, although such a device may not be necessary as described herein. Absent another component for measuring the speed of a vehicle 2 operating at a low speed, an embodiment can require the vehicles 2 to maintain a specified minimum speed. To this extent, for some applications, such as a sensing component 34 embedded in a roadway or on a bridge deck, the minimum speed can be reasonably assumed during normal traveling conditions for the vehicles 2.

In an embodiment, the computer system 20 resolves a set of static weights corresponding to a vehicle 2 from measurement data corresponding to dynamic forces caused by the vehicle 2 moving past the sensing component 34 using a solution comprising a combination of theoretical and empirical approaches. Initially, the computer system 20 can construct a model of the vehicle 2 moving past the sensing component 34, which can be stored as WIM data 40 (FIG. 2). The model can include all of the forces and factors, which are presumed to be significant in the particular application, and can include various sub-models. For example, a pre-existing vehicle performance model can be obtained from a third party, such as a vehicle simulation product (e.g., CARSIM® provided by Mechanical Simulation Corporation), and utilized as a sub-model in the model. Similarly, a sub-model can be created from finite element modeling performed on a designed sensing element 50A, 50B to determine its response to various types of loads. In any event, the computer system 20 can use the model to provide data predicting the responses to be seen by the sensing component 34 under various proposed test conditions.

The constructed model can include various computations, which account for the various forces that can be present as a vehicle 2 passes by the sensing component 34. For example, the model can include the following equation to consider the lateral forces induced by turning the vehicle 2, which will induce an apparent change in weight as follows:

$$\Delta W_F = \frac{A_Y * W_S}{t_W} \left[ \frac{h_2 K_{F'}}{K_F + K_R - W_s h_2} + \frac{L - a_S}{L} * Z_{RF} \right] + \frac{W_{uF}}{t_W} Z_{WF} \quad \text{Equation 3}$$

where $\Delta W_F$ is the change in apparent weight on a given wheel, $K_R$ and $K_F$ are the rear and front roll stiffnesses, respectively, $Z_{RF}$ and $Z_{WF}$ are the roll center heights of the axles of the vehicle 2, $h_2$ is the height of the center of gravity above the nominal roll axis, $a_s$ is the location of the sprung mass center of gravity, $A_Y$ is the transverse acceleration, $t_W$ is the track width, $W_S$ is the static weight of the vehicle 2, and L is the wheel base. As illustrated, numerous variables are involved in such a calculation, and different vehicles 2 will have different stiffnesses, centers of gravity, roll centers, etc.

In any event, an environment, such as the environment 10A, can be physically constructed and the computer system 20 can obtain WIM data 40 for various types of vehicles 2 traveling over the sensing component 34 at various speeds and performing various driving operations (e.g., steering, braking, etc.). The computer system 20 can perform a comparison of the acquired WIM data 40 with data derived from the model. One or more iterations of design, modeling, and testing can be performed in order to arrive at a target congruency level between the model and the real world measurements. Such an iterative process can be used to determine, for example, how much of a difference variation in a parameter (e.g., roll stiffness) makes on the overall measurements, whether a usable function for average roll stiffness can be derived and used across the weights of various vehicles or will additional information, such as a general category of vehicle (e.g., sport utility vehicle, panel truck, tractor trailer, hatchback, etc.) be required to obtain an estimate of roll stiffness, and/or the like.

Similarly, such an iterative process can derive the effect of variations in other attributes that are not easily modeled. For example, the effect of different cargo configurations can be examined by keeping other variables constant while passing differently loaded vehicles 2 over the sensing component 34. Extracting partial or complete usable models for use by the computer system 20 in determining one or more relevant parameters may require non-algorithmic approaches. For example, a neural network can be instantiated and trained to recognize a particular target phenomena across a wide variety of situations. Regardless, it is understood that various approaches can be utilized to obtain a complete model for use by the computer system 20 in evaluating and processing measurement data for vehicles 2 during operation in the environment 10A.

Construction of a well-known representation of the causes and effects of various types of dynamic effects can be used by the computer system 20 to create a solution to the "inverse problem." That is, given the signals having all the resultant dynamic effects, and given the data from the system on the conditions, the computer system 20 can determine which dynamic effects were responsible for which portion of the signal and remove them, leaving only the static forces. In an embodiment, the computer system 20 can use a neural network, a Bayesian network, a Kalman filter, and/or the like, to recognize the effects from the signals derived from the WIM data 40 received from the sensing component 34. Furthermore, in addition to filtering raw data acquired by various sensing devices in the sensing component 34 to remove spurious noise, the computer system 20 can break down the data into different components relevant to the various solutions the computer system 20 uses to detect and recognize the various dynamic contributions to the detected apparent weight. For example, the computer system 20 can apply high, low, and/or band-pass filters, Fast Fourier Transforms, wavelet decomposition, and/or the like, to break the acquired data into different components.

Figure 7:
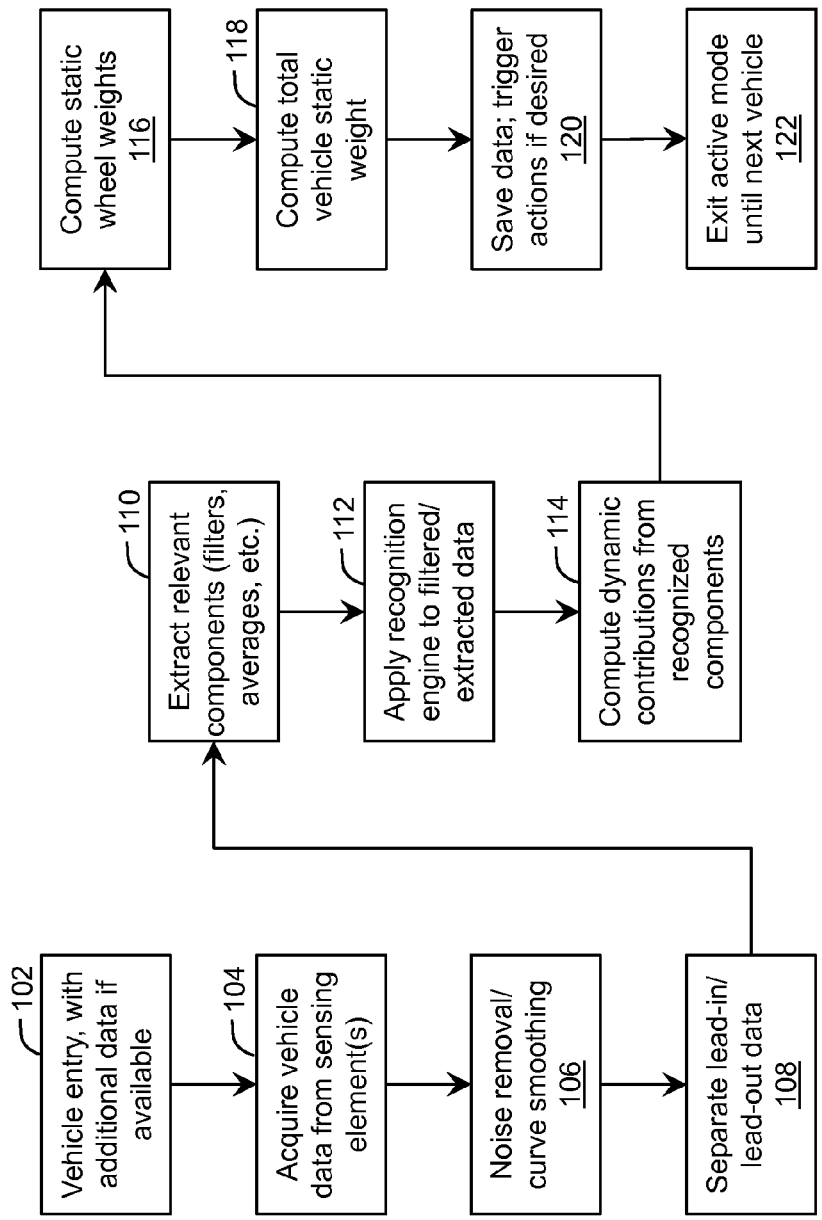
FIG. 7 shows an illustrative process for weighing a vehicle in motion according to an embodiment.

FIG. 7 shows an illustrative process for weighing a vehicle in motion according to an embodiment, which can be implemented by the computer system 20 (FIG. 2). Referring to FIGS. 3A and 7, in action 102, a vehicle 2 approaches and enters the sensing component 34. As described herein, the computer system 20 can obtain various WIM data 40 (FIG. 2) regarding the vehicle 2, such as a speed (e.g., from an acoustic or radar speed device), a number of axles, identification data (e.g., an image of the vehicle 2), and/or the like, using any solution.

In action 104, the computer system 20 can acquire WIM data 40 from the sensing component 34, e.g., from the various sensing devices located in the sensing elements 50A, 50B. In action 106, the computer system 20 can perform one or more types of filtering, e.g., noise remove, curve smoothing, and/or the like, on some or all of the WIM data 40. In action 108, the computer system 20 can separate out/identify the WIM data 40 corresponding to the distance D (FIG. 6) from the WIM data 40 corresponding to the lead-in and lead-out transition widths TW using any solution. However, it is understood that the computer system 20 can retain the WIM data 40 corresponding to the transition widths TW, as such data can include information useful in the WIM process. For example, in an embodiment including ramps 52A-52D (FIG. 3B), the computer system 20 can process a transient or "bounce" present in the data from when the wheel 4 went up the ramp and reached the top to derive information regarding a stiffness of the various components of the suspension.

Regardless, in action 110, the computer system 20 can process the WIM data 40 corresponding to the distance D to extract (e.g., using filters, averages, and/or the like) the relevant components for analysis. In action 112, the computer system 20 can apply a recognition engine to the filtered/extracted WIM data 40. In an embodiment, the computer system 20 can apply various types of analysis methods on the WIM data 40. Such analysis methods can be performed concurrently, e.g., using one or more specialized parallel-processors, digital signal processors, and/or the like.

Once the various contributing components have been recognized in the WIM data 40, in action 114 the computer system 20 can compute the dynamic contributions from each of the recognized components, e.g., using the final models instantiated in the computer system 20. In action 116, the computer system 20 can compute the static wheel weights, e.g., by removing all of the computed dynamic component contributions from the apparent wheel weight. In action 118, the computer system 20 can compute a static weight of an axle (e.g., by summing the static wheel weights for each wheel 4 on the axle), the total static weight of the vehicle 2 (e.g., by summing the static wheel weights for each of the wheels 4), and/or the like. In action 120, the computer system 120 can store the calculated static weight(s) corresponding to the vehicle 2 along with some of the other data as a WIM record for the vehicle 2 in the WIM data 40 for later processing. Furthermore, the computer system 20 can evaluate the static weight(s) corresponding to the vehicle 2 with one or more ranges of acceptable weights and trigger any actions, if necessary. For example, the computer system 20 can generate a signal for processing by another system indicating that the vehicle 2 requires further inspection, e.g., due to a calculated static weight exceeding a maximum threshold, and/or the like. Subsequently, in action 122, the computer system 20 and sensing component 34 can exit an active mode until another vehicle 2 approaches/enters the environment 10A.

While the embodiments described herein have primarily described various components and solutions for weighing a vehicle 2 in motion, it is understood that an embodiment can include various other ancillary components as would be recognized by one of ordinary skill in the art of vehicle detection and evaluation. For example, an embodiment of an environment described herein can include a set of sensing devices for detecting a vehicle 2 arriving at and/or departing from the sensing component 34. In this case, the computer system 20 and/or sensing device(s) in the sensing component 34 can be completely powered down in the absence of any vehicle 2 for which to acquire measurement data. Furthermore, data from such sensing devices can enable the computer system 20 to determine when something has gone wrong, such as a vehicle 2 not exiting from the area of the sensing component 34. Additionally, it is understood that one or more sensing devices and/or a sensing element 50A, 50B can include various types of safety mechanisms. For example, a load sensing device, which has a limited range of accurate sensing, can include a stop to prevent damage to the sensor should the load exceed the range. A sensing element 50A, 50B also can include multiple sensing devices of a similar type, but having different overlapping ranges of accurate sensing, which can enable the sensing element 50A, 50B to acquire accurate data over a wider range.

Similarly, embodiments described herein can be implemented as part of a larger inspection system, which is configured to acquire various types of measurement and evaluation data for the vehicle 2. For example, in a commercial vehicle inspection application, an embodiment can provide a dynamic weigh station for trucks, which can eliminate a need to periodically divert and effectively stop for significant periods of time a large number of the commercial vehicles passing through an inspection area. In this case or in similar applications, a system can include a solution for detecting and classifying the vehicles passing the inspection location on the roadway so that the system does not acquire or process measurement data for irrelevant vehicles 2, such as passenger cars. One solution can incorporate a "smart video" system, such as that described in U.S. Pat. No. 7,355,508, which can classify the vehicles 2 passing a sensing component 34 can identify those vehicles 2 that meet a commercial vehicle criterion. Similarly, an embodiment can be implemented as part of a comprehensive railroad inspection system, which is configured to evaluate various operating conditions of the railroad vehicles (e.g., wheel condition, brake condition, and/or the like).

While the embodiments shown and described herein are directed to weighing a vehicle 2 in motion, it is understood that aspects of the invention can be directed to other applications. For example, in an embodiment, a system can include a sensing component 34 similar to that shown and described herein, which is attached to a bridge structure, such as an overpass, railroad bridge (e.g., girders or trusses), and/or the like. In this case, the computer system 20 can process the data acquired by the sensing component 34 as part of a load determination/monitoring solution for the bridge. In an embodiment, a component of the bridge structure itself can operate as a load plate as described herein. In addition to detecting and tracking potential overloading, the computer system 20 can process the data using additional or modified processing and/or data from other sensing devices, such as modified load cell modules affixed to other portions of the bridge structure, to accurately characterize the response of the bridge structure to various types of loads. Information regarding the actual, real-time response of a bridge structure to various types of loads can be useful in determining the best way to design bridges to support specific loads, e.g., neither overdesigning or underdesigning, and also can detect incipient failure modes which were not anticipated in the original design, especially if the bridge structure is aging or has been modified from the original design.

While primarily shown and described herein as a method and system for weighing a vehicle in motion, it is understood that aspects of the invention further provide various alternative embodiments. For example, in one embodiment, the invention provides a computer program fixed in at least one computer-readable medium, which when executed, enables a computer system to weigh a vehicle in motion. To this extent, the computer-readable medium includes program code, such as the WIM program 30 (FIG. 2), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the WIM program 30 (FIG. 2), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for weighing a vehicle in motion. In this case, a computer system, such as the computer system 20 (FIG. 2), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system comprising:
  a sensing element including:
    a load plate;

a tiltmeter configured to acquire tilt measurement data for the load plate;
a plurality of vertical force sensing devices located below the load plate and spaced in an area defined by the load plate; and
a set of horizontal force sensing devices located below the load plate; and
a computer system configured to perform a method of evaluating an object, the method including:
obtaining load measurement data from the plurality of vertical force sensing devices and the set of horizontal sensing devices, wherein the load measurement data corresponds to a load applied to the load plate;
processing the load measurement data to identify a horizontal component of the load and a vertical component of the load; and
evaluating the object based on the horizontal and vertical components of the load and the tilt measurement data.

2. A system comprising:
a sensing element including:
a load plate;
a plurality of vertical force sensing devices located below the load plate and spaced in an area defined by the load plate; and
a set of horizontal force sensing devices located below the load plate;
a second sensing element located adjacent to the sensing element such that each wheel on an axle of a vehicle traverses over one of the sensing elements; and
a computer system configured to perform a method of evaluating the vehicle, the method including:
obtaining load measurement data from the plurality of vertical force sensing devices and the set of horizontal sensing devices, wherein the load measurement data corresponds to a load applied to the load plate while the vehicle moves over the sensing elements;
processing the load measurement data to identify a horizontal component of the load and a vertical component of the load; and
evaluating the vehicle based on the horizontal and vertical components of the load, wherein the evaluating includes:
calculating a track width for the vehicle;
calculating a wheelbase for the vehicle; and
calculating a set of static weights corresponding to the vehicle.

3. The system of claim 1, wherein the object is the load plate and the object is a component of a bridge structure, and wherein the evaluating includes characterizing a response of the bridge structure to various types of loads.

4. The system of claim 1, wherein the load plate is a portion of a rail and the object is a rail vehicle, wherein the obtaining occurs while the rail vehicle moves over the sensing element, and wherein the evaluating includes calculating a set of static weights corresponding to the rail vehicle.

5. The system of claim 1, wherein the sensing element is a portable sensing element configured to be temporarily placed in a path of a vehicle, the system further comprising:
a first ramp configured to provide a substantially smooth transition from a surface of the path to a surface of the load plate; and
a second ramp configured to provide a substantially smooth transition from the surface of the load plate to the surface of the path.

6. The system of claim 1, further comprising a set of ancillary sensing devices for acquiring ancillary measurement data corresponding to an environment of the sensing element, wherein the evaluating is further based on the ancillary measurement data.

7. A system comprising:
a sensing element including:
a load plate;
a plurality of vertical force sensing devices located below the load plate and spaced in an area defined by the load plate; and
a set of horizontal force sensing devices located below the load plate;
a computer system configured to perform a method of evaluating an object, the method including:
obtaining load measurement data from the plurality of vertical force sensing devices and the set of horizontal sensing devices, wherein the load measurement data corresponds to a load applied to the load plate;
processing the load measurement data to identify a horizontal component of the load and a vertical component of the load; and
evaluating the object based on the horizontal and vertical components of the load; and
a set of ancillary sensing devices for acquiring ancillary measurement data corresponding to an environment of the sensing element, wherein the set of ancillary sensing devices includes: a temperature sensing device, a tiltmeter configured to acquire data corresponding to a tilt of a surface of the load plate, an anemometer, and a wind direction sensing device, and wherein the evaluating is further based on the ancillary measurement data.

8. The system of claim 1, wherein an interface between the load plate and each of the plurality of vertical force sensing devices isolates the corresponding vertical force sensing device from substantially all of a horizontal component of the load, and wherein an interface between the load plate and each of the set of horizontal force sensing devices isolates the corresponding horizontal force sensing device from substantially all of a vertical component of the load.

9. A system comprising:
at least one pair of sensing elements located adjacent to each other, each sensing element including:
a load plate;
a plurality of vertical force sensing devices located below the load plate and spaced in an area defined by the load plate; and
a set of horizontal force sensing devices located below the load plate; and
a computer system configured to perform a method of weighing a vehicle traveling over the at least one pair of sensing elements, wherein all wheels on an axle of the vehicle concurrently travel over the load plates of the at least one pair of sensing elements, the method including:
obtaining load measurement data from the plurality of vertical force sensing devices and the set of horizontal sensing devices for each axle of the vehicle while the vehicle travels over the at least one pair of sensing elements;
processing the load measurement data to identify a horizontal component of a load resulting from the passage of each wheel of the vehicle and a vertical component of the load; and
calculating a set of static weights corresponding to the vehicle based on the horizontal and vertical components of the load, wherein the calculating includes:
determining a speed and an acceleration of the vehicle as it travels over the at least one pair of sensing elements;

calculating a static weight for each of the plurality of wheels of the vehicle based on the speed and acceleration of the vehicle, a track width of the vehicle, a wheelbase of the vehicle, and the horizontal and vertical components of the load resulting from the passage of the wheel; and calculating a static weight for at least one of: an axle of the vehicle or the vehicle based on the static weights for the plurality of wheels.

10. The system of claim 9, wherein the at least one pair of sensing elements are embedded in a roadway such that a top surface of the load plate is substantially planar with a roadway on which the vehicle is traveling.

11. The system of claim 9, wherein the vehicle is a rail vehicle, and wherein the load plate of each sensing element comprises a portion of a rail on which the rail vehicle is traveling.

12. The system of claim 9, wherein the method further includes calculating the track width of an axle of the vehicle based on the horizontal and vertical components of the load resulting from the passage of all the wheels on an axle of the vehicle.

13. The system of claim 9, further comprising a set of wind sensors configured to acquire wind measurement data corresponding to an ambient wind speed and an ambient wind direction as the vehicle travels over the at least one pair of sensing elements, wherein the calculating a static weight for each of the plurality of wheels is further based on the wind measurement data.

14. The system of claim 9, wherein each sensing element further includes a tiltmeter configured to acquire tilt measurement data for the load plate, wherein the calculating a static weight for each of the plurality of wheels is further based on the tilt measurement data.

15. A method of weighing a vehicle in motion, the method comprising:

obtaining load measurement data from a plurality of vertical force sensing devices and a set of horizontal sensing devices for each axle of the vehicle while the vehicle travels over a set of load plates physically connected to the plurality of vertical force sensing devices and the set of horizontal sensing devices;

obtaining tilt measurement data for the set of load plates;

processing the load measurement data to identify a horizontal component of a load resulting from the passage of each wheel of the vehicle and a vertical component of the load; and calculating a set of static weights corresponding to the vehicle based on the horizontal and vertical components of the load and the tilt measurement data.

16. The method of claim 15, wherein the calculating includes:

determining a speed and an acceleration of the vehicle as the vehicle travels over the set of load plates;

calculating a static weight for each of the plurality of wheels of the vehicle based on the speed and acceleration of the vehicle, a track width of the vehicle, a wheelbase of the vehicle, and the horizontal and vertical components of the load resulting from the passage of the wheel; and calculating a static weight for at least one of: an axle of the vehicle or the vehicle based on the static weights for the plurality of wheels.

17. The method of claim 15, further comprising calculating the track width of an axle of the vehicle based on the horizontal and vertical components of the load resulting from the passage of all the wheels on an axle of the vehicle.

18. The method of claim 15, further comprising obtaining wind measurement data corresponding to an ambient wind speed and an ambient wind direction as the vehicle travels over the set of load plates, wherein the calculating a set of static weights is further based on the wind measurement data.

19. The method of claim 15, wherein the load is influenced by at least one dynamic force unknown prior to the obtaining, and wherein the processing further accounts for the influence of the at least one dynamic force.

20. The system of claim 1, wherein the load is influenced by at least one dynamic force unknown prior to the obtaining, and wherein the processing further accounts for the influence of the at least one dynamic force.

* * * * *